April 29, 1924.

R. D. McMANIGAL

REGENERATIVE CONTROL

Filed April 18, 1922

1,492,137

WITNESSES:

INVENTOR
Robert D. McManigal.
BY
ATTORNEY

Patented Apr. 29, 1924.

1,492,137

UNITED STATES PATENT OFFICE.

ROBERT D. McMANIGAL, OF LOGAN, OHIO, ASSIGNOR TO WESTINGHOUSE ELECTRIC & MANUFACTURING COMPANY, A CORPORATION OF PENNSYLVANIA.

REGENERATIVE CONTROL.

Application filed April 18, 1922. Serial No. 555,058.

*To all whom it may concern:*

Be it known that I, ROBERT D. McMANIGAL, a citizen of the United States, and a resident of Logan, in the county of Hocking and State of Ohio, have invented a new and useful Improvement in Regenerative Controls, of which the following is a specification.

My invention relates to motor-control systems and it has particular relation to control systems for governing the operation of a motor during regeneration.

One object of my invention is to provide a control system for a motor which shall insure that, during regeneration, the braking torque of the motor will be substantially constant, regardless of relatively great changes in the speed of the motor.

Another object of my invention is to provide means for so energizing the field-magnet winding of a motor during regeneration that, upon a decrease in the current traversing the armature circuit of the motor, a corresponding increase in the energization of the field-magnet winding will be effected to secure the same braking torque.

Another object of my invention is to provide an auxiliary generator for so energizing the field-magnet winding of a motor that the voltage of the exciting generator will vary substantially in inverse proportion to the current traversing the armature of the main motor.

Briefly speaking, my invention comprises providing a motor-generator set and a stabilizing resistor to vary the flux of the main field-magnet winding of a driving motor during regeneration in inverse proportion to the speed of the motor.

Figure 1:
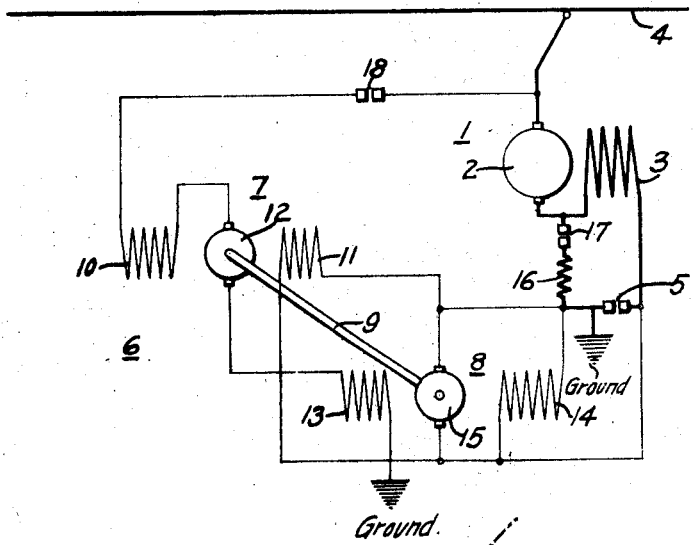
Figure 2:
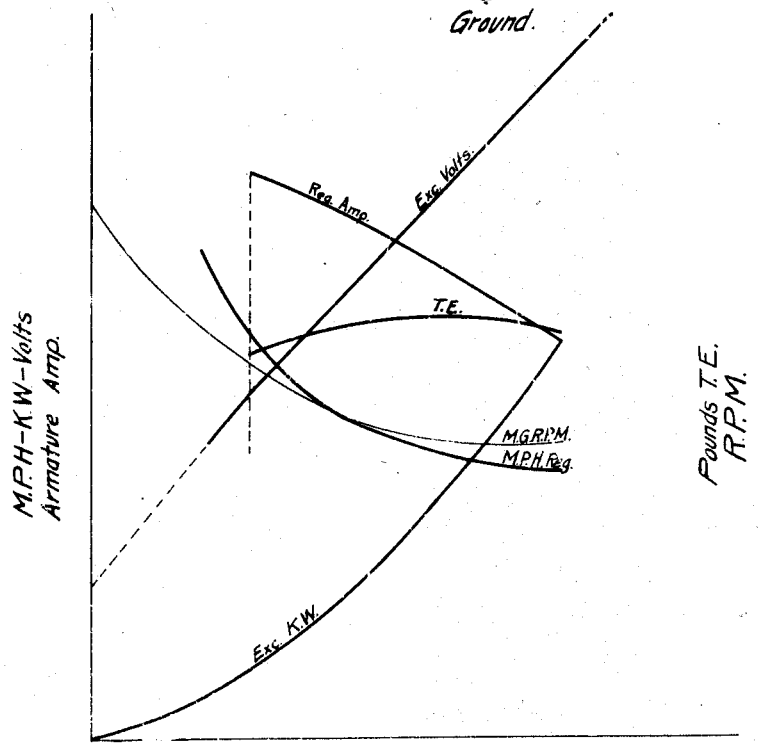

For a better understanding of my invention, reference may be made to the accompanying drawing, Figure 1 of which is a diagrammatic view of a motor-control system constructed in accordance with my invention;

Fig. 2 is a curve chart showing the relation of the tractive effort and speed of a motor to the current traversing its main field-magnet winding during regeneration.

Fig. 2 also shows the relation of the main armature current, exciter voltage and exciter power to the current traversing the field-magnet winding of the motor during regeneration.

Referring to Fig. 1 of the drawing, a main driving motor 1 is shown provided with an armature 2 and a series field-magnet winding 3, which is connected, during motoring, to a trolley conductor 4 and a return circuit marked "Ground," by the closure of the switch 5. A motor-generator set 6, comprising a motor 7 and a generator 8, which are mechanically connected by means of a shaft 9, is employed to energize the field-magnet winding 3 of the motor 1 during regeneration. The auxiliary motor 7 is provided with a plurality of field-magnet windings 10 and 11 and an armature 12. The auxiliary generator 8 is provided with a plurality of field-magnet windings 13 and 14 and an armature 15. A stabilizing resistor 16 may be connected in circuit with the armature 2 of the main motor 1 by the closure of a switch 17. During regeneration, the switch 5 is opened and the switch 17 closed, thereby providing an armature circuit from ground through stabilizing resistor 16, switch 17 and armature 2 to the trolley conductor 4.

The auxiliary motor 7 is energized by a circuit, which is established upon the closure of a switch 18, from the trolley conductor 4 through the switch 18, series field-magnet winding 10 and armature 12 of the motor 7 and field-magnet winding 13 of the generator 8 to a return circuit marked "Ground." When the armature 15 of the generator 8 is driven by the motor 7, the shunt field-magnet winding 14 of the generator 8 and a separately excited field-magnet winding 11 of the motor 7 are energized by current traversing the armature 15. The field-magnet winding 3 of the main driving motor 1 is energized by current traversing the circuit comprising the armature 15 of the generator 8, stabilizing resistor 16, switch 17 and field-magnet winding 3 of the motor 1. When the armature 2 of the main driving motor 1 is rotating at a high speed, the flux of the field-magnet winding 3 of the motor 1 will be relatively low, if the voltage across the terminals of the armature 15 of the auxiliary generator 8 is constant.

The reason for the flux of the field-magnet winding 3 becoming of relatively low value is that the voltage drop across the stabilizing resistor 16 will be greater, other conditions being the same, when the armature 2 is rotating at a relatively high speed and thus regenerating a relatively heavy current to the line, than when it is rotating at a lower speed. The voltage drop across the resistor 16 is equal to the product of the current traversing the resistor 16 and the value of the resistance thereof. The resistance of the resistor 16 being constant, the voltage drop across the terminals thereof will increase directly as the current traversing the armature 2 of the main driving motor 1 increases. Assume that the voltage across the terminals of the armature 15 of the generator 8 is increased, then the voltage across the terminals of the field-magnet winding 3 will increase. The increased voltage across the winding 3 will increase the current traversing the armature 2 of the main driving motor. This increase in current traversing the armature 2 will increase the voltage drop across the stabilizing resistor 16, and the voltage across the terminals of the field-magnet winding 3 of the main driving motor 1 will decrease, thus re-establishing stable braking conditions. It is, therefore, apparent that, as the speed of the motor 1 decreases and, therefore, the current traversing the armature 2 thereof decreases, the excitation of the field-magnet winding 3 increases, thus increasing the load of the generator 8. If the voltage across the terminals of the armature 15 of the auxiliary generator 8 is constant, the increased excitation of the field-magnet winding 3 of the main driving motor 1 is not sufficient to maintain substantially constant braking torque for the motor 1 as its speed decreases. Therefore, I have provided a generator having series characteristics whereby the voltage will build up, if the electrical load across the terminals of the armature thereof is increased.

The series-wound auxiliary motor 7 decreases its speed as the load upon the armature 15 of the auxiliary generator 8 increases. The excitation of its shunt field-magnet winding 14 increases, because of the rising voltage characteristic of the generator 8. The rising voltage characteristic of the generator 8 is caused by the current traversing the armature 12 of the auxiliary motor 7 increasing when the motor 7 is subjected to an increased load, thereby causing the energization of the separately excited field-magnet winding 13 of the auxiliary generator 8 to increase to compensate for the decrease in speed of the generator 8.

The field-magnet winding 11 of the auxiliary motor 7 is so energized by the armature 15 of the generator 8 that it prevents the speed of the armature 12 of the motor 7 from becoming excessive as the load upon the generator 8 decreases. However, it is not so designed as to maintain the motor 7 at a constant speed, but rather to limit its speed variations to a predetermined value that is less than that of an ordinary series motor. The result of this arrangement of the connections of the motor-generator set is to secure a flat speed characteristic for the auxiliary motor 7 rather than a series characteristic.

The system of control is so constructed that the stabilizing resistor 16 acts not only as a stabilizer between the current of the field-magnet winding 3 and the current of the armature 2 of the main motor 1, but also as a regulator for the exciter. If the voltage of the exciter 8 tends to increase, then the voltage across the terminals of the field-magnet winding 3 increases, thereby increasing the current traversing the armature 2 and the stabilizing resistor 16 and thus increasing the potential across the resistor 16 to compensate for the increase in voltage of the generator 8. If the speed of the generator 8 decreases because of a decrease in line voltage across the terminals of the motor 7, then the excitation of the field-magnet winding 3 of the main motor 1 decreases, and the regenerative current traversing the armature 2 of the main motor 1 and the stabilizing resistor 16 tend to decrease, but this decrease is counterbalanced by the reduced line voltage across the armature 2, thereby securing balanced-torque conditions.

Referring to Fig. 2 of the drawing, it will be noted that the curve marked T. E., illustrating the relation of braking effort in foot pounds to the value of the current in amperes traversing the main field-magnet winding 3 of the motor 1 is substantially constant for a wide range of speed of the motor 1.

The voltage of the auxiliary generator 8 (see curve marked Exc. volts) increases in value as the regenerative current (see curve marked Reg. Amp.) traversing the armature 2 of the motor 1 decreases.

The curves representing the speed of the main motor 1 and auxiliary motor 7 are designated as M. P. H. Reg. and M. G. R. P. M., respectively. It will be noted, by examining the curves M. G. R. P. M. and Exc. K. W. that the power furnished by the auxiliary generator 8 increases as the speed of the auxiliary motor 7 decreases.

From the above description, it is apparent that I have provided a system of control for a motor whereby substantially constant braking torque is secured throughout a wide range of speed during regeneration.

While I have shown my invention in its preferred form, minor modifications may be made in the arrangement of circuits and apparatus employed without departing from the spirit of my invention. I desire, therefore, to be limited only by the scope of the appended claims.

I claim as my invention:—

1. In a motor-control system, the combination with a main motor having an armature and a field-magnet winding, of a resistor in series relation with said armature during regenerative braking of said motor, an auxiliary generator having a plurality of field-magnet windings for energizing the field-magnet winding of said main motor, an auxiliary motor having a plurality of field-magnet windings and an armature for driving said generator, one of the field-magnet windings of said auxiliary motor being energized by said generator and one of the field-magnet windings of said generator being connected in series relation with the armature and a field-magnet winding of said auxiliary motor.

2. A motor-control system comprising a main motor having an armature and a field-magnet winding, an auxiliary generator, having a field-magnet winding and an armature, for energizing said main motor field-winding, an auxiliary motor, for driving said generator, having an armature, a series field-magnet winding and a separately-excited field-magnet winding, said separately-excited field-magnet winding being energized by said generator and the field-magnet winding of said generator being connected in series relation with the armature and another of the windings of said auxiliary motor.

3. A motor-control system comprising a motor having an armature and a field-magnet winding, a generator, having a plurality of field-magnet windings and an armature, for energizing said main motor field-magnet winding, an auxiliary motor having a plurality of field-magnet windings and an armature, and means for mechanically connecting said auxiliary motor to said generator, one of the windings of said generator and a winding and the armature of said auxiliary motor being connected in series relation and one of the windings of said generator and said auxiliary motor being connected in parallel relation and energized by current traversing the armature of said generator.

4. In a motor-control system, the combination with a main motor having an armature and a field-magnet winding, of an auxiliary generator, having a plurality of field-magnet windings, for energizing said main motor field-magnet winding during regenerative braking of said motor, an auxiliary motor, having a field-magnet winding and an armature, for driving said generator, one of the field-magnet windings of said generator being connected in series relation with the armature of said auxiliary motor, and the other of said generator field-magnet windings being connected in shunt relation to the armature of said generator.

5. In a motor-control system, the combination with a main motor having an armature and a field-magnet winding, of an auxiliary generator, having a plurality of field-magnet windings, for energizing said main motor field-magnet winding during regenerative braking of said motor, an auxiliary motor, having a field-magnet winding and an armature, for driving said generator, one of the field-magnet windings of said generator being connected in series relation with the armature of said auxiliary motor, and the other of said generator field-magnet windings being connected in shunt relation to the armature of said generator, and means, comprising a resistor in series relation with the main motor field-magnet winding, for automatically regulating the voltage of the auxiliary motor in accordance with the speed of said main motor armature.

In testimony whereof, I have hereunto subscribed my name this 5th day of April 1922.

ROBERT D. McMANIGAL.